United States Patent
Cao

(10) Patent No.: US 11,404,179 B2
(45) Date of Patent: Aug. 2, 2022

(54) ION-OPTICAL CAVITY COUPLING SYSTEM AND METHOD

(71) Applicant: HUAWEI TECHNOLOGIES CO., LTD., Guangdong (CN)

(72) Inventor: Dongyang Cao, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 5 days.

(21) Appl. No.: 17/172,488

(22) Filed: Feb. 10, 2021

(65) Prior Publication Data

US 2021/0166831 A1    Jun. 3, 2021

Related U.S. Application Data

(63) Continuation of application No. PCT/CN2019/100253, filed on Aug. 12, 2019.

(30) Foreign Application Priority Data

Aug. 14, 2018    (CN) .......................... 201810925152.0

(51) Int. Cl.
*G21K 1/00* (2006.01)
*G06N 10/00* (2022.01)
(Continued)

(52) U.S. Cl.
CPC .............. *G21K 1/003* (2013.01); *G06N 10/00* (2019.01); *H04B 10/70* (2013.01); *H01J 49/422* (2013.01)

(58) Field of Classification Search
CPC ........ G21K 1/003; G06N 10/00; H04B 10/70; H01J 49/422
(Continued)

(56) References Cited

U.S. PATENT DOCUMENTS 9,858,531 B1    1/2018 Monroe et al.
2013/0221216 A1*    8/2013 Makarov ............. H01J 49/0027
250/281
(Continued)

FOREIGN PATENT DOCUMENTS

CN    101320016 A    12/2008
CN    103714878 A    4/2014
(Continued)

OTHER PUBLICATIONS

Axel Kuhn et al., Short Roadmap to Quantum Networking by Light-Matter Interfacing University of Oxford, Apr. 2019, 4 pages.
(Continued)

*Primary Examiner* — Nicole M Ippolito
(74) *Attorney, Agent, or Firm* — Womble Bond Dickinson (US) LLP

(57) ABSTRACT

An ionic optical cavity coupling system and method are described. The system includes a first optical cavity, a second optical cavity, and an ion trap system including a direct current electrode pair, a grounding electrode pair, and a radio frequency electrode pair. At least one ion is arranged in the ion trap system. Furthermore, the first optical cavity is used for obtaining a quantum optical signal and sending the quantum optical signal to the ion trap system, so that quantum information of the quantum optical signal is transferred to a single ion in the ion trap system. The second optical cavity is used for obtaining quantum information in the single ion in the ion trap system.

20 Claims, 8 Drawing Sheets

(51) Int. Cl.
*H04B 10/70* (2013.01)
*H01J 49/42* (2006.01)

(58) Field of Classification Search
USPC ................................. 250/251, 396 R, 397
See application file for complete search history.

(56) References Cited

U.S. PATENT DOCUMENTS

| | | | |
|---|---|---|---|
| 2016/0322188 A1 | | 11/2016 | Youngner |
| 2017/0221995 A1* | | 8/2017 | Taylor ................. H01L 27/1443 |
| 2019/0057855 A1* | | 2/2019 | Kim ...................... H01J 49/424 |

FOREIGN PATENT DOCUMENTS

| | | |
|---|---|---|
| CN | 103854955 A | 6/2014 |
| CN | 105190827 A | 12/2015 |
| CN | 105308716 A | 2/2016 |
| CN | 205582886 U | 9/2016 |
| CN | 106683976 A | 5/2017 |
| GB | 2527268 A | 12/2015 |
| GB | 2547628 A | 8/2017 |
| WO | 2008122127 A1 | 10/2008 |

OTHER PUBLICATIONS

S. Debnath et al., Demonstration of a small programmable quantum computer with atomic qubits. Nature, vol. 536, Aug. 4, 2016, 10 pages.

A. Stute et al., Tunable Ion-Photon Entanglement in an Optical Cavity. arXiv:1301.0275v1 [quant-ph] Jan. 2, 2013, 7 pages.

Brandstatter Birgit Ursula, Integration of fiber mirrors and ion traps for a high-fidelity quantum interface, Jul. 2013, 126 Pages.

Casabone Bernardo: Two ions coupled to an optical cavity: From an enhancedquantum computer interface towards distributed quantum computing , Apr. 2015, 129 pages.

Marko Cetina et al., One-dimensional coupled to an optical cavity, New Journal of Physics, May 1, 2013, 14 pages.

Schi.ippert Klemens, Quantum interface—A fiber cavity perpendicular to a linear ion trap , 2020, 140 pages.

* cited by examiner

ION-OPTICAL CAVITY COUPLING SYSTEM AND METHOD

CROSS-REFERENCE TO RELATED APPLICATIONS

This application is a continuation of International Application No. PCT/CN2019/100253, filed on Aug. 12, 2019, which claims priority to Chinese Patent Application No. 201810925152.0, filed on Aug. 14, 2018. The disclosures of the aforementioned applications are hereby incorporated by reference in their entireties.

TECHNICAL FIELD

This application relates to the field of optoelectronic technologies, and in particular, to an ion-optical cavity coupling system and method.

BACKGROUND

An ion trap is a technology of a combination of electric and magnetic fields used to capture charged particles. The ion trap technology is widely used in fields, such as mass spectrometry, basic physics parameter measurement, quantum computation, quantum storage, and atomic clocks. By virtue of excellent qubit properties, the ion trap may be used in quantum information processing, and quantum information can be transmitted between two or more quantum nodes (i.e., ion traps) without distortion by establishing a quantum network. Coupling between a plurality of ions and an optical cavity is the core to constructing a complex quantum network and distributed quantum computation. Therefore, how to realize strong coupling between an ion and an optical cavity in an ion trap system is the key to realizing distributed quantum computation.

Currently, in an existing ion-optical cavity coupling solution, an optical cavity is radially disposed along an ion trap system. In a process of transferring information on a quantum node in this solution, first, a quantum optical signal is obtained by using an optical cavity, and interaction between an ion in the ion trap system and the quantum optical signal is stored in phase information of an entangled state of two ions. Then, the phase information of the entangled state of the two ions is converted into phase information of a photon. Finally, the phase information of the photon is emitted from the optical cavity and transmitted to another quantum node at a long distance through an optical fiber channel. This implements transferring of the information about the quantum node.

However, in the foregoing ion-optical cavity coupling solution, after the quantum optical signal enters the optical cavity, an interaction result of the interaction between the quantum optical signal and the ion needs to be stored in the phase information of the entangled state of the two ions, then the phase information of the entangled state of the two ions is converted into the phase information of the photon, and the phase information of the photon is emitted from the optical cavity. As a result, transfer efficiency of quantum states of an ion and a photon is low.

SUMMARY

This application provides an ion-optical cavity coupling system and method, to resolve a problem of low transfer efficiency of quantum states of an ion and a photon in an existing ion-optical cavity coupling solution.

A first aspect of this application provides an ion-optical cavity coupling system, including: a first optical cavity, a second optical cavity, and an ion trap system, where the ion trap system includes a direct current electrode pair, a ground electrode pair, and a radio frequency electrode pair;

at least one ion is arranged in the ion trap system, a straight line on which an equilibrium position of the at least one ion is located is a center line, and the center line is perpendicular to two optical cavity mirrors of the first optical cavity;

the two optical cavity mirrors of the first optical cavity are symmetrically distributed on two sides of the at least one ion, two optical cavity mirrors of the second optical cavity are distributed in space constituted by the two optical cavity mirrors of the first optical cavity, and there is an included angle between the second optical cavity and the center line;

two direct current electrodes of the direct current electrode pair are symmetrically distributed on outer sides of the two optical cavity mirrors of the first optical cavity, and the ground electrode pair and the radio frequency electrode pair are distributed in the space constituted by the two optical cavity mirrors of the first optical cavity;

the first optical cavity is used to obtain a quantum optical signal, and send the quantum optical signal to the ion trap system, to enable quantum information of the quantum optical signal to be transferred to a single ion in the ion trap system; and the second optical cavity is used to obtain the quantum information in the single ion in the ion trap system.

DESCRIPTION OF EMBODIMENTS

Figure 1:
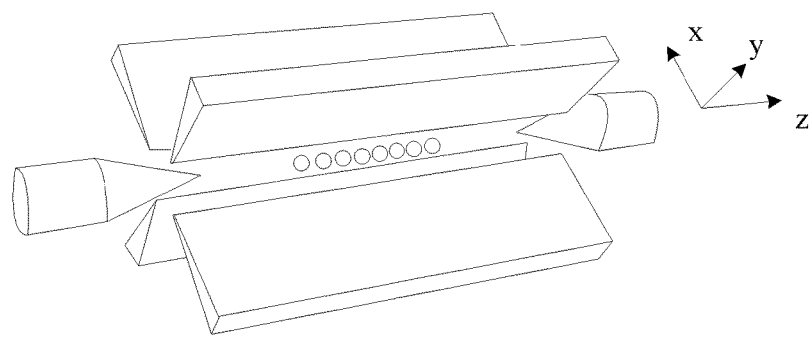
FIG. 1 is a schematic diagram of a structure of a linear trap.

In the following, some terms of the embodiments of this application are described, to help persons skilled in the art have a better understanding.

Strong coupling: A strength of coupling between an atom or ion and an optical cavity is far greater than a spontaneous emission strength of the atom or ion and an attenuation rate of the optical cavity.

Distributed quantum computation: A plurality of quantum nodes are used, each quantum node includes a plurality of qubits, to jointly complete a specific quantum computation task, and information transmission between different quantum nodes is implemented by a photon that carries quantum information. Distributed quantum computation is especially suitable for some hardware systems that cannot be integrated on a large scale, and is also especially suitable for a quantum computation task that cannot be completed by only a local quantum node.

Quantum network: Quantum information is transmitted between different quantum nodes by using photons, so that different quantum nodes can interact with each other through the quantum network.

Mode volume of an optical cavity: The mode volume is proportional to a product of a square of a beam waist radius of the optical cavity and a length of the optical cavity.

Large optical cavity: The large optical cavity is an optical cavity whose beam waist radius is greater than a spacing between two ions. Optionally, in the embodiments of this application, the large optical cavity is represented by a first optical cavity.

Small optical cavity: The small optical cavity is an optical cavity whose beam waist radius is less than a spacing between two ions. Optionally, in the embodiments of this application, the small optical cavity is represented by a second optical cavity.

Optionally, the following first briefly describes applicable scenarios of the embodiments of this application.

An ion trap is a technology of a combination of electric and magnetic fields used to capture charged particles. The ion trap technology is widely used in the fields such as mass spectrometry, basic physics parameter measurement, quantum computation, quantum storage, and atomic clocks. To capture charged particles under the influence of an electromagnetic field, a low electric potential energy point needs to be generated in space under the influence of the electromagnetic field. However, according to the Maxwell's equations, there is no three-dimensional lowest potential energy point for the charged particles in an electrostatic field. Therefore, the charged particles cannot be captured only under the influence of the electrostatic field.

It can be understood that charged particles move along a direction of an electric field line. Because there are no other charges in space of the electrostatic field, and the electric field line does not terminate, the charged particles keep moving in one direction instead of being static or confined to a region. To capture the charged particles, the electrostatic field and a magnetostatic field need to be combined or the electrostatic field and an alternating electric field need to be combined. The former case of combination is referred to as a Penning trap, and the latter case of combination is referred to as a Paul trap. The penning trap is generally used for measurement of properties of ions and stable subatomic particles, for example, an electronic magnetic moment. The Paul trap is generally used in the field of atomic clocks or quantum information processing. The Paul trap is also referred to as an electric quadrupole ion trap or a radio frequency trap. Paul traps may be classified into linear traps and needle traps according to whether a plurality of ions can be captured at the same time (whether there are a plurality of low electric potential energy points). The linear traps, where a plurality of ions can be captured at the same time, are widely used in quantum information processing, and are considered as one of hardware systems that can most likely implement quantum computation. Optionally, in the embodiments of this application, an ion trap is a linear trap, unless otherwise specified.

Figure 2:
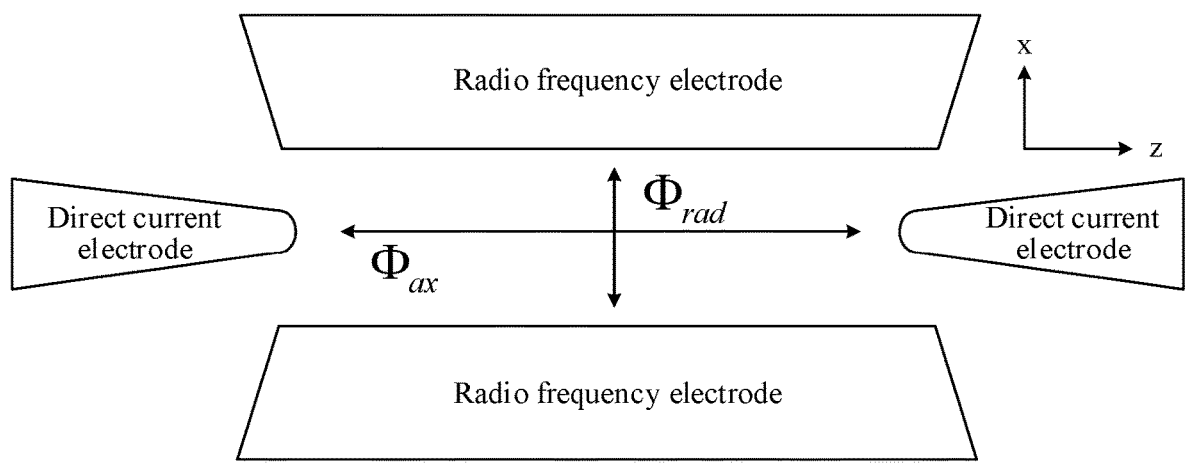
FIG. 2 is a front view of the linear trap shown in FIG. 1.
Figure 3:
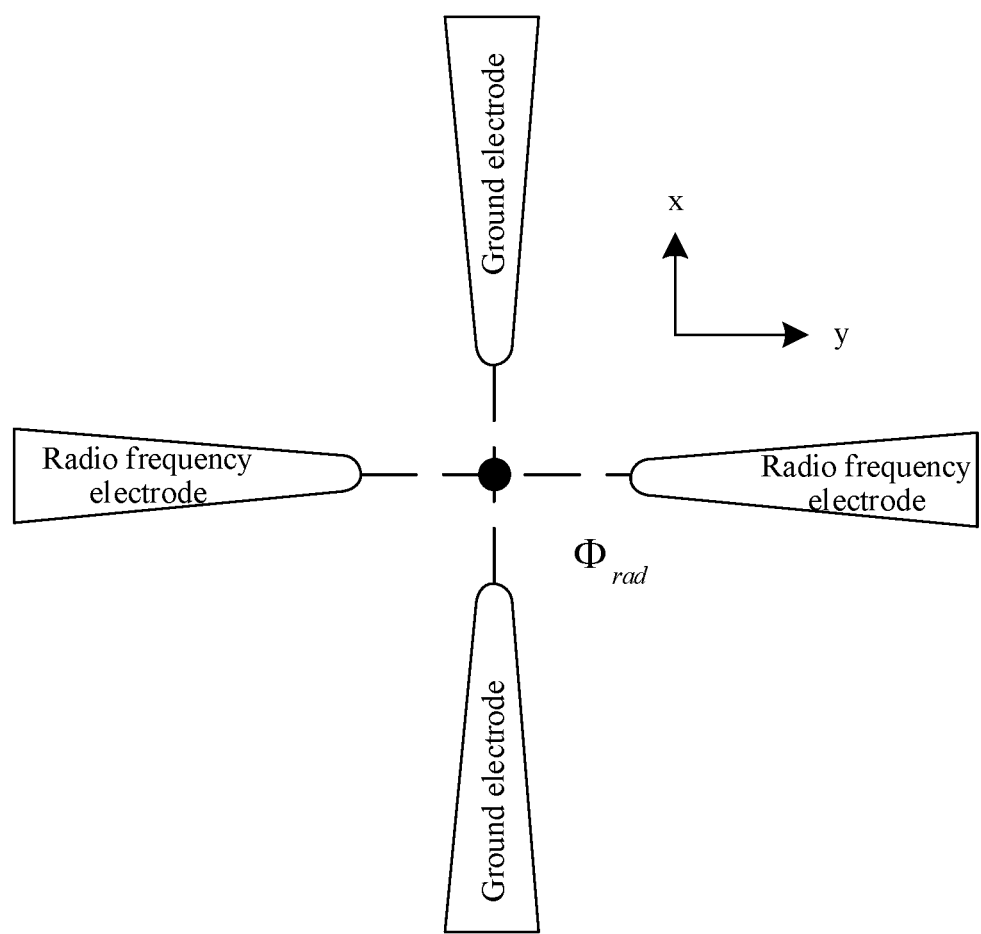
FIG. 3 is a left view of the linear trap shown in FIG. 1.

FIG. 1 is a schematic diagram of a structure of a linear trap. FIG. 2 is a front view of the linear trap shown in FIG. 1. FIG. 3 is a left view of the linear trap shown in FIG. 1. Optionally, as shown in FIG. 1 to FIG. 3, the linear trap may include six electrodes. Four blade-shaped electrodes are divided into two groups. One group of diagonal electrodes (referred to as radio frequency electrodes) are applied with an alternating voltage; and the other group of diagonal electrodes (referred to as ground electrodes) are grounded, to form a four-level electric potential in radial directions (xy directions). Two needle-shaped electrodes (referred to as direct current electrodes) at two ends are applied with a same static voltage, to form an electrostatic trap in an axial direction (a z direction). The foregoing six electrodes together form a three-dimensional low potential energy point, and trap charged ions.

Optionally, to make persons skilled in the art better understand a linear trap, the following briefly describes a principle of the linear trap.

Optionally, an electrostatic potential in free space needs to satisfy a Laplace's equation, which is specifically represented by the following formula (1):

$$\nabla^2 \Phi = 0 \tag{1}$$

In the formula, $\Phi$ represents an electric potential energy in the electrostatic field, and $\nabla$ is a gradient symbol and represents calculation for a partial derivative of the electric potential energy.

In addition, the electrostatic potential of the linear trap may be represented by the following formula (2):

$$\Phi(x,y,z) = \Sigma_{i=x,y,z} \Phi_0 k_i r_i^2 \tag{2}$$

In the formula, $r_i$ represents a spatial position of coordinates (x, y, z), $k_i$ represents a coefficient corresponding to each coordinate component, and $\Phi_0$ represents a reference electric potential energy of an ion and is a constant.

Figure 4:
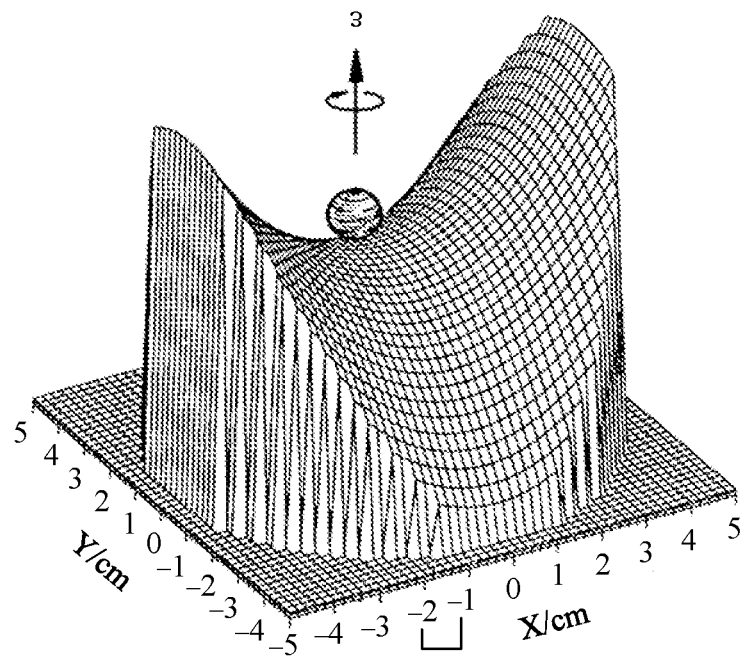
FIG. 4 is a schematic diagram of a saddle point of an electrostatic potential in an electrostatic field.

$k_x x + k_y y + k_z z = 0$ can be obtained according to the formula (1) and the formula (2). Therefore, one of the coefficients $k_x$, $k_y$, and $k_z$ needs to be a negative number, that is, the electrostatic potential has a metastable saddle point in a direction. For details, refer to FIG. 4. FIG. 4 is a schematic diagram of the saddle point of the electrostatic potential in the electrostatic field. As shown in FIG. 4, charged particles are not stationary or confined to a region in the electrostatic field. Therefore, the charged particles cannot be stably trapped in the electrostatic field.

Optionally, as shown in FIG. 4, if the electrostatic potential is rotated, an equivalent two-dimensional trap electric potential energy can be obtained. Specifically, in actual application, the alternating electric field is applied to the xy directions to form the two-dimensional trap potential energy in the xy directions, and the electrostatic field is applied to the z direction to form a one-dimensional trap potential energy in the z direction. Optionally, the two-dimensional trap potential energy $\Phi_{rad}(x, y, z, t)$ in the xy directions may be represented by the following formula (3), and the one-dimensional trap potential energy $\Phi_{ax}(x, y, z)$ in the z direction may be represented by the following formula (4):

$$\Phi_{rad}(x, y, z, t) = \frac{V_{RF}\cos(\Omega_{RF}t) + U_r}{2}(\alpha_x x^2 + \alpha_y y^2 + \alpha_z z^2) \quad (3)$$

$$\Phi_{ax}(x, y, z) = \frac{U_{DC}}{2}(\beta_x x^2 + \beta_y y^2 + \beta_z z^2) \quad (4)$$

In the formulas, $V_{RF}$ represents a voltage of the alternating electric field, $\Omega_{RF}$ represents a frequency of the alternating electric field, $U_r$ represents a voltage of the electrostatic field in the xy directions, $\alpha_x$, $\alpha_y$, and $\alpha_z$ respectively represent a coefficient corresponding to each coordinate component of a moving ion in the xy directions, $U_{DC}$ represents a voltage of the electrostatic field in the z direction, and $\beta_x$, $\beta_y$, $\beta_z$ and respectively represent a coefficient corresponding to each coordinate component of the moving ion in the z direction. In the embodiments, $V_{RF}$, $\Omega_{RF}$, $U_r$, $U_{DC}$, $\alpha_x$, $\alpha_y$, $\alpha_z$, $\beta_x$, $\beta_y$, and $\beta_z$ all are constants.

Optionally, the moving ion in the electrostatic field satisfies the Newton's second law of motion shown in the following formula (5):

$$\ddot{r} = \frac{F}{m} = \frac{e}{m}E(x, y, z, t) = -\frac{e}{m}\nabla\Phi_{tot} = -\frac{e}{m}(\nabla\Phi_{rad} + \nabla\Phi_{ax}) \quad (5)$$

In the formulas represents an acceleration of the moving ion, F represents an electric field force applied to the moving ion, m represents a mass of the moving ion, E (x, y, z, t) represents an electric field strength of the moving ion at a moment t at the spatial coordinates (x, y, z), e represents a charge amount of the moving ion, $\Phi_{rad}$ represents the two-dimensional trap potential energy in the xy directions, and $\Phi_{ax}$ represents the one-dimensional trap potential energy in the z direction.

Optionally, a motion trajectory $r_i(t)$ of the moving ion can be obtained according to the foregoing formula (3), formula (4), and formula (5), and $r_i(t)$ is expressed by the following formula (6):

$$r_i(t) \approx \bar{r}_i\cos(\omega_i t)\left(1 + \frac{q_i}{2}\cos(\Omega_{RF}t)\right) \quad (6)$$

In the formula, $r_i(t)$ represents the motion trajectory of the moving ion $\bar{r}_i$ represents an amplitude of the moving ion in harmonic motion, $\omega_i$ represents a harmonic frequency of the moving ion in the harmonic motion, and $$\omega_i = \frac{\Omega_{RF}}{2}\sqrt{a_i + \frac{q_i^2}{2}},$$

where $a_i$ and $q_i$ are constants, $a_i \ll 1$, $q_i \ll 1 a_i \ll 1$, $q_i \ll 1$, and $\Omega_{RF}$ represents the frequency of the alternating electric field.

In conclusion, motion of the ion in the linear trap may include two types of motion: the harmonic motion in which the amplitude is $\bar{r}_i$ and the frequency is $\omega_i$, and micro motion accompanied with additional drive ($a_i$ and $q_i$ are constants that are far less than 1, and values of $a_i$ and $q_i$ are related to a structure of the linear trap and an applied voltage). In actual application, generally, the micro motion can be offset by employing an external compensation electrode. Therefore, only the harmonic motion of the ion is generally considered. It can be understood that, the motion of the ion in the linear trap may be similar to motion that a ball connected to a spring vibrates back and forth near an equilibrium position, where the equilibrium position is a center position where the ion performs the harmonic motion in the linear trap (i.e., the ion trap). When the ion is located at the equilibrium position, a recovery force of the ion is 0. At the equilibrium position, the ion has a maximum speed, a maximum kinetic energy, and zero potential energy.

The following briefly describes optical properties of the ion trap and interaction between the ion trap and light.

It can be learned from the foregoing analysis that the ion performs the harmonic motion in the ion trap. However, external electromagnetic noise and a high-speed moving particle remaining in space increase energy of the ion, so that the ion jumps out of the ion trap. To trap the ion in the ion trap for a long time, a kinetic energy of the ion needs to be reduced, that is, an amplitude of the ion is controlled to reduce during the harmonic motion.

Optionally, in atomic physics, an atom or an ion is generally cooled through Doppler cooling.

Generally, a bivalent atom is generally used for an ion trap system that is used for quantum information processing, because there is only one electron outside the nucleus after one electron is lost, and a property of an ion consisting of the nucleus and one electron is similar to a property of a hydrogen atom. Optionally, in the embodiments of this application, a calcium ion in an ion trap is used as an example for description. For example, FIG. 5 is a schematic diagram of energy levels of a calcium ion.

Figure 5:
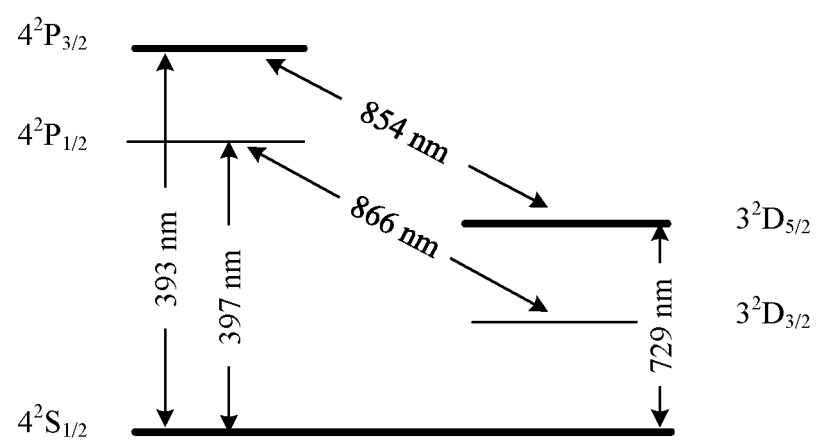
FIG. 5 is a schematic diagram of energy levels of a calcium ion.

The calcium ion shown in FIG. 5 is used as an example. As shown in FIG. 5, the ion is first in an energy ground state S (for example, represented by $4^2S_{1/2}$). When 397-nm laser light is used to irradiate a trapped ion in an ion trap, a state of the ion transits from the ground state S (for example, represented by $4^2S_{1/2}$) to an excited state P (for example, represented by $4^2P_{1/2}$). Because the excited state P is an unstable state, and the ion in the excited state P rapidly radiates energy of a 397-nm photon, the ion returns to the ground state S ($4^2S_{1/2}$). This process is repeated, so that energy of the ion is taken away by the 397-nm photon. Therefore, energy of the ion is reduced.

Similarly, for the ion in the energy ground state S ($4^2S_{1/2}$), when 393-nm laser light is used to irradiate the trapped ion in the ion trap, the state of the ion transits from the ground state S ($4^2S_{1/2}$) to an excited state P (for example, represented by $4^2P_{3/2}$). Because the excited state P is an unstable state, and the ion in the excited state P rapidly radiates energy of a 393-nm photon, the ion returns to the ground state S ($4^2S_{1/2}$). This process is repeated, so that energy of the ion is taken away by the 393-nm photon. Therefore, energy of the ion is reduced.

It should be noted that a temperature of an ion may be rapidly reduced through Doppler cooling. For example, the temperature of the ion may be reduced from a room temperature 1000 K to 500 uK. A trapped ion obtained through Doppler cooling can be used as a good qubit for quantum information processing.

In quantum information processing, an important direction is to construct a quantum network, and a characteristic of the quantum network is that quantum information needs to be transmitted between two or more quantum nodes without distortion. By virtue of excellent qubit properties, the ion trap has become one of quantum node candidates. To enable the quantum information to be transmitted between two long-distance ion traps, quantum information in an ion on a quantum node needs to be first transferred to a photon, then the quantum information in the photon is transmitted to another quantum node through an optical channel, and the information in the photon is reversely transmitted to the ion on the another quantum node.

Figure 6:
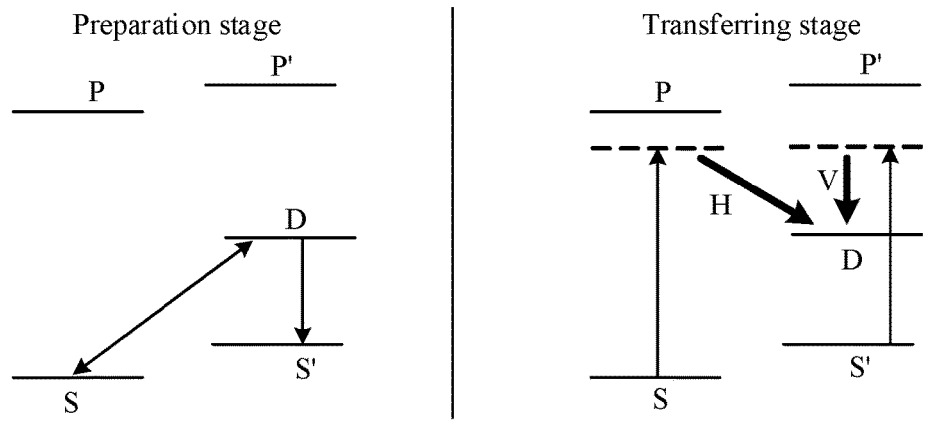
FIG. 6 is a schematic diagram of transferring quantum information between an ion and a photon.

Optionally, in this embodiment of this application, a calcium ion is still used as an example to describe a process of transferring quantum information between an ion and a photon. A specific process is shown in FIG. 6. FIG. 6 is a schematic diagram of transferring the quantum information between the ion and the photon.

Referring to FIG. 5 and FIG. 6, the diagram of the energy level of the calcium ion in the ion trap is shown in FIG. 5. However, energy splitting occurs in the calcium ion in the ion trap in the presence of an external magnetic field due to a Zeeman (Zeeman) effect (each spectral line emitted by an ion that is placed in a strong magnetic field is split into three components).

Optionally, as shown in FIG. 5 and FIG. 6, in the embodiments of this application, a quantum state of an ion is coded by using energy levels obtained after splitting of ground states (the ground state s and a ground state s'), and an energy level of a metastable state D ($3^2D_{5/2}$) is used as a transition energy level to prepare the quantum state of the ion (that is, the ion is excited by using 729-nm laser light), to obtain the quantum state of the ion represented by the following formula (7):

$$\text{Quantum state of ion} = \cos \alpha |s\rangle + e^{i\varphi} \sin \alpha |s'\rangle \tag{7}$$

In the formula, the symbol $|\rangle$ represents a quantum state, $|s\rangle$ represents that the ion is in the ground state s, $|s'\rangle$ represents that the ion is in the ground state s', and $\alpha$ represents a constant. In the embodiments of this application, these are applied through this specification, unless otherwise specified. $\cos \alpha$ represents a coefficient for which the ion is in the ground state s, $e^{i\varphi} \sin \alpha$ represents a coefficient for which the ion is in the ground state s', and $\varphi$ represents a phase difference of the quantum state of the ion.

In the embodiments of this application, to transmit the quantum state of the ion to a quantum state of a photon without distortion, it needs to be ensured that both an amplitude and a phase of the quantum state remain unchanged. This may be implemented, for example, by executing a dual-color Raman virtual process. Optionally, in the dual-color Raman virtual process, an ion is irradiated by using two beams of laser light, while a photon is only emitted but not received.

Optionally, as shown in FIG. 5 and FIG. 6, in the magnetic field, an energy level of the excited state P of the ion is also split into two energy levels that respectively correspond to two energy levels of the ground state S. The ion is irradiated (i.e., not resonantly excited) by using 393-nm dual-color Raman laser light, and the ion transits to the excited state P ($4^2P_{3/2}$). Because the excited state P ($4^2P_{3/2}$) is unstable, the ion drops back to the metastable state D ($3^2D_{5/2}$) and an 854-nm photon is emitted. When the ion is excited (not resonantly excited) by using 397-nm dual-color Raman laser light, the ion transits to the excited state P ($4^2P_{1/2}$). Because the excited state P ($4^2P_{1/2}$) is unstable, the ion drops back to the metastable state D ($3^2D_{3/2}$) and an 866-nm photon is emitted.

It can be understood that energy of a photon is inversely proportional to a wavelength, that is, a longer wavelength of the photon indicates less energy. Therefore, when the 393-nm laser light and the 397-nm laser light, that is, the dual-color Raman laser light, are used to irradiate the ion, the ion jumps to different heights, as shown in FIG. 5.

Because the magnetic field defines an axis of quantization, a radiated photon has different polarizations varied with angular momentum, and the ion is finally in the metastable state D. The quantum state of the radiated photon is expressed by the following formula (8):

$$\text{Quantum state of photon} = \cos \alpha |H\rangle + e^{i\varphi} \sin \alpha |V\rangle \tag{8}$$

In the formula, H represents a horizontal direction of the quantum state of the photon, V represents a vertical direction of the quantum state of the photon, $\varphi$ represents a phase difference of the quantum state of the photon, $\cos \alpha$ represents a coefficient in the direction H when the photon is in the metastable state D, and $e^{i\varphi} \sin \alpha$ represents a coefficient in the direction V when the photon is in the metastable state D.

It can be learned from the formula (7) and the formula (8) that an amplitude and a phase of the quantum state of the photon are respectively consistent with an amplitude and a phase of the quantum state of the ion. Therefore, coherent transfer between the quantum information in the ion and the quantum information in the photon is implemented, as represented by the following formula (9):

$$(\cos \alpha |s\rangle + e^{i\varphi} \sin \alpha |s'\rangle) \otimes |0\rangle \rightarrow |D\rangle \otimes (\cos \alpha |H\rangle + e^{i\varphi} \sin \alpha |V\rangle) \tag{9}$$

$(\cos \alpha |s\rangle + e^{i\varphi} \sin \alpha |s'\rangle)$ represents the quantum state of the ion, $|0\rangle$ represents an initial state of the photon, $|D\rangle$ represents the metastable state D of the ion, and $(\cos \alpha |H\rangle + e^{i\varphi} \sin \alpha |V\rangle)$ represents the quantum state of the photon.

Figure 7:
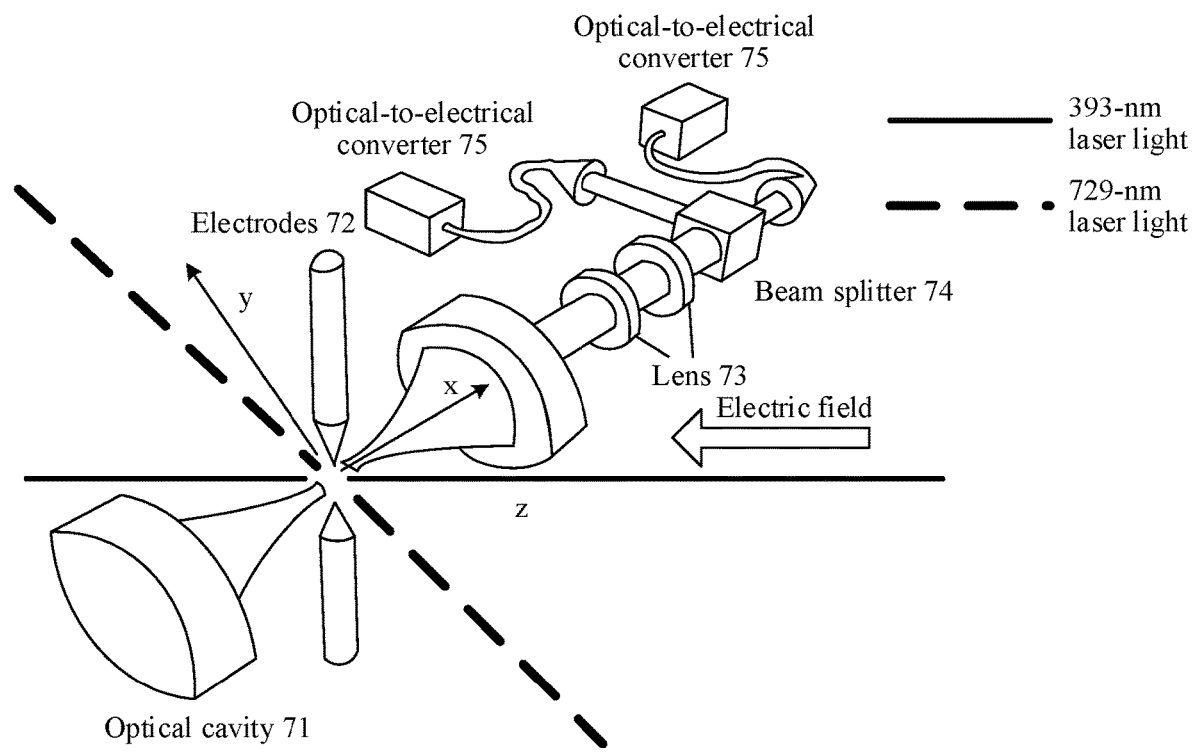
FIG. 7 is a schematic diagram of a structure of hardware for transferring quantum information between an ion and a photon.

Optionally, FIG. 7 is a schematic diagram of a structure of hardware for transferring quantum information between an ion and a photon. As shown in FIG. 7, the schematic diagram of the structure of the hardware for transferring the quantum information between the ion and the photon may include: an optical cavity 71, electrodes 72, a lens 73, a beam splitter 74, and an optical-to-electrical converter 75.

Optionally, as shown in FIG. 7, the quantum information in the ion is transferred to the quantum information in the photon by using the optical cavity 71, the electrodes 72, the lens 73, the beam splitter 74, and the photoelectric converter 75 through interaction. In the embodiments, because a single ion can radiate only a single photon each time, and losses occurring on a channel are considered, collection efficiency of photons is extremely low. In addition, an optical cavity needs to be used in a dual-color Raman virtual process to implement Lambda light transferring. An ultra-high reflection film is coated on one mirror of the optical cavity, and a high reflection film is coated on the other mirror, so that an 854-nm photon can be oscillated in the optical cavity for a plurality of times before being emitted. In this way, a quantity of radiated photons can be greatly increased through stimulated radiation, thereby improving efficiency of the quantum information transferring from the ion to the photon. Therefore, the ion-optical cavity coupling structure is the core to implementing a quantum network and distributed quantum computation.

Figure 8:
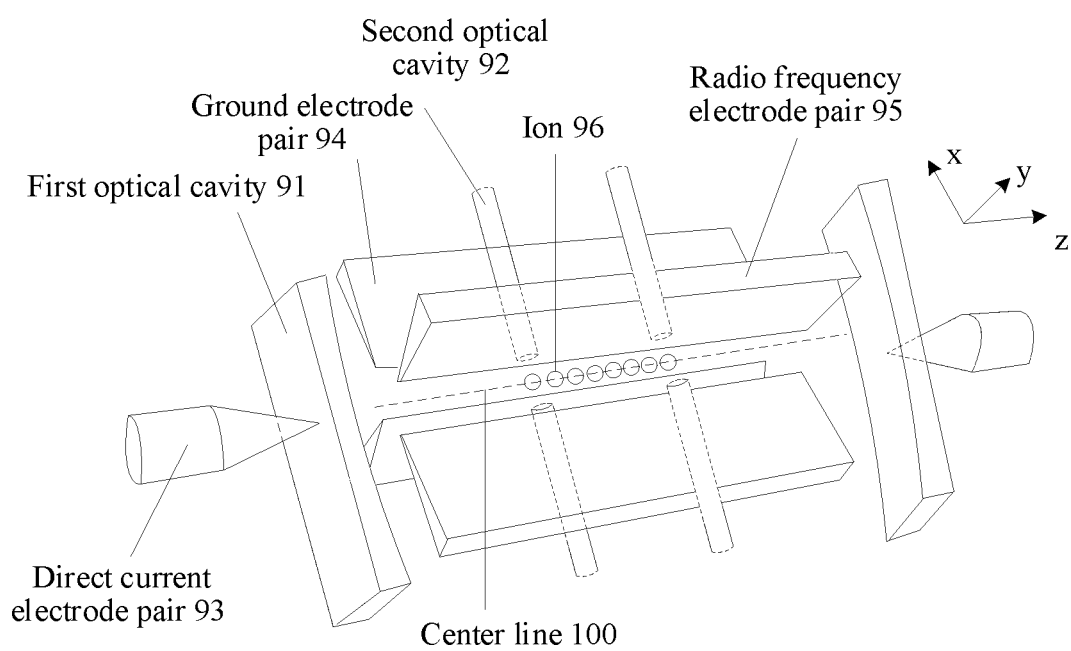
FIG. 8 is a schematic structural diagram of an ion-optical cavity coupling system according to an embodiment of this application.
Figure 9:
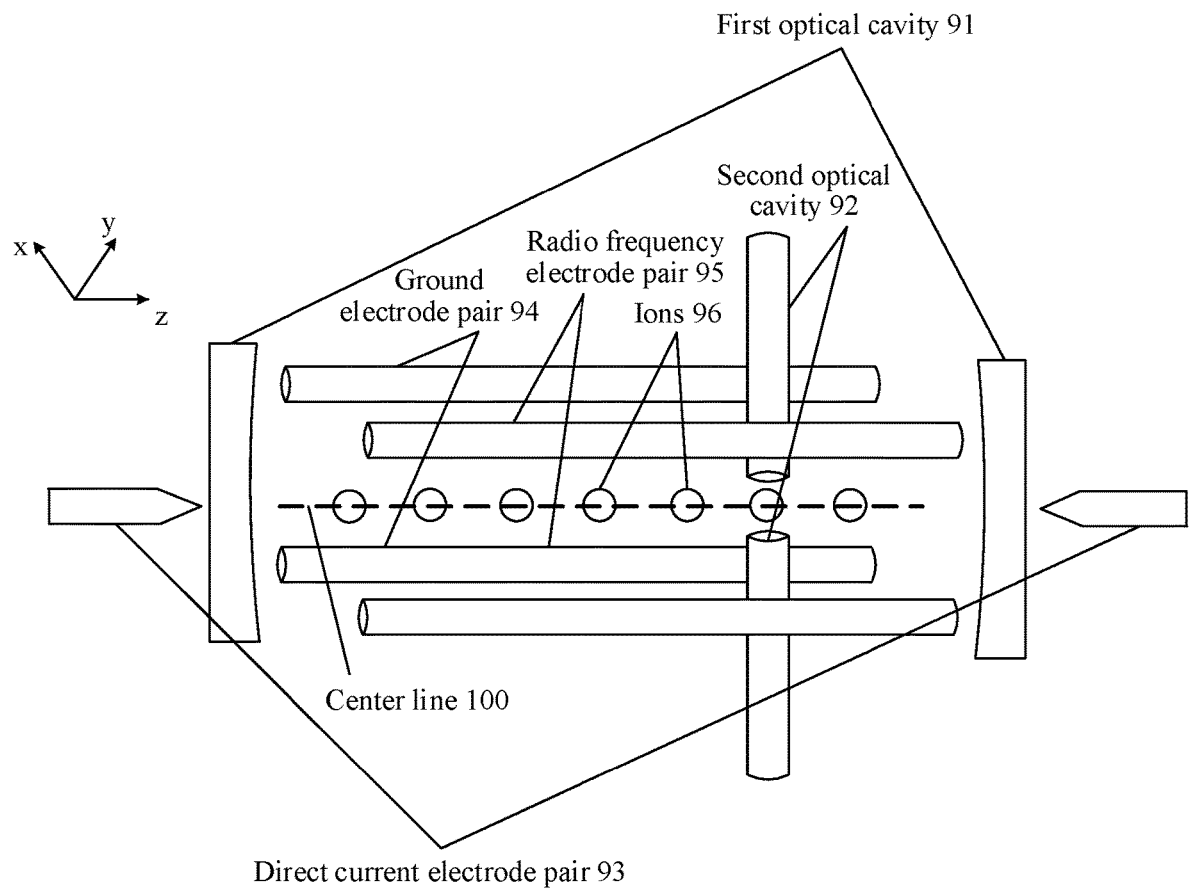
FIG. 9 is a schematic planar diagram of an ion-optical cavity coupling system.

FIG. 8 is a schematic structural diagram of an ion-optical cavity coupling system according to an embodiment of this application. FIG. 9 is a schematic planar diagram of the ion-optical cavity coupling system. As shown in FIG. 8 and FIG. 9, the ion-optical cavity coupling system may include: a first optical cavity 91, a second optical cavity 92, and an ion trap system. The ion trap system includes a direct current electrode pair 93, a ground electrode pair 94, and a radio frequency electrode pair 95.

Referring to FIG. 8 and FIG. 9, at least one ion 96 is arranged in the ion trap system, a straight line on which an equilibrium position of the at least one ion 96 is located is a center line 100, and the center line 100 is perpendicular to two optical cavity mirrors of the first optical cavity 91.

The two optical cavity mirrors of the first optical cavity 91 are symmetrically distributed on two sides of the at least one ion 96. Two optical cavity mirrors of the second optical cavity 92 are distributed in space constituted by the two optical cavity mirrors of the first optical cavity 91. There is an included angle between the second optical cavity 92 and the center line 100.

Optionally, two direct current electrodes of the direct current electrode pair 93 are symmetrically distributed on outer sides of the two optical cavity mirrors of the first optical cavity 91. The ground electrode pair 94 and the radio frequency electrode pair 95 are distributed in the space constituted by the two optical cavity mirrors of the first optical cavity 91.

Optionally, the at least one ion 96 is arranged in space constituted by the direct current electrode pair 93, the ground electrode pair 94, and the radio frequency electrode pair 95.

The first optical cavity 91 is used to obtain a quantum optical signal, and send the quantum optical signal to the ion trap system, to enable quantum information of the quantum optical signal to be transferred to a single ion in the ion trap system. The second optical cavity 92 is used to obtain the quantum information in the single ion in the ion trap system.

Specifically, referring to FIG. 8 and FIG. 9, the direct current electrode pair 93, the ground electrode pair 94, and the radio frequency electrode pair 95 that are included in the ion trap system may be referred to as ion trap electrodes. The three pairs of electrodes may be used to produce an electromagnetic field, so as to confine an ion. Optionally, for the ion-optical cavity coupling system provided in this embodiment of this application, that the ion trap system includes one direct current electrode pair 93, one ground electrode pair 94, and one radio frequency electrode pair 95 is used as an example for description. It can be understood that each optical cavity is constituted by two optical cavity mirrors that are spaced and parallel to each other.

Optionally, referring to FIG. 8 and FIG. 9, a position relationship between the first optical cavity 91, the second optical cavity 92, and the electrode pairs in the ion trap system may be alternatively explained as follows.

Distances between the two optical cavity mirrors of the second optical cavity 92 and the center line 100 are the same. Two ground electrodes of the ground electrode pair 94 and two radio frequency electrodes of the radio frequency electrode pair 95 are symmetrically distributed on two sides of the center line 100. A connection line between the two direct current electrodes of the direct current electrode pair 93 is parallel to the center line 100.

Optionally, in a possible implementation, there is an included angle between a connection line between the two optical cavity mirrors of the second optical cavity 92 and the center line 100, where the included angle is greater than 0 degrees and less than 180 degrees.

Optionally, there is an included angle between a ground electrode of the ground electrode pair 94 and an adjacent radio frequency electrode, and the included angle is greater than 0 degrees and less than 180 degrees.

Referring to FIG. 8 and FIG. 9, the two optical cavity mirrors of the second optical cavity 92 are symmetrically distributed along the center line 100 (that is, a connection line between same positions of the two optical cavity mirrors of the second optical cavity 92 is perpendicular to the center line 100). One optical cavity mirror of the second optical cavity 92 is located in the included angle between the ground electrode and the adjacent radio frequency electrode, and the other optical cavity mirror of the second optical cavity 92 is located in an included angle between the other ground electrode and the other adjacent radio frequency electrode.

Optionally, in the following specific embodiment, a direction in which the center line 100 is located is used as a z direction (that is, a direction parallel to the center line 100), where the z direction is also referred to as an axial direction; and directions perpendicular to the center line 100 are used as xy directions, where the xy directions are also referred to as radial directions, and the xy directions are perpendicular to the axial direction.

Optionally, in space in which the ion-optical cavity coupling system is located, assuming that the radio frequency electrode pair 95 is disposed along the y direction, and the ground electrode pair 94 is disposed along the x direction, a saddle-shaped electric potential can be formed in the xy directions to confine an ion. A direct current signal is applied to an electrode pair in the z direction, and therefore, the electrode pair may be referred to as the direct current electrode pair 93. The direct current electrode pair 93 is configured to trap an ion in the z direction.

Optionally, each ground electrode of the ground electrode pair 94 and each radio frequency electrode of the radio frequency electrode pair 95 are distributed at intervals, and the two ground electrodes of the ground electrode pair 94 and the two radio frequency electrodes of the radio frequency electrode pair 95 are both symmetrically distributed along the center line 100.

Optionally, the straight line on which the equilibrium position of the at least one ion in the ion trap system is located and that is perpendicular to the two optical cavity mirrors of the first optical cavity is the center line 100. Assuming that the direction in which the center line 100 is located is the z direction, the two optical cavity mirrors of the first optical cavity 91 are located on inner sides of the two direct current electrodes of the direct current electrode pair 93. The first optical cavity 91 may be used to obtain the external quantum optical signal, and send the external quantum optical signal to the ion trap system, to enable the quantum information of the quantum optical signal to be transferred to the single ion in the ion trap system.

Optionally, there is an included angle between the second optical cavity 92 and the center line 100. In a possible implementation, the connection line between same positions of the two optical cavity mirrors of the second optical cavity 92 may be perpendicular to the center line 100, that is, the second optical cavity 92 may be disposed to be perpendicular to the z direction; or there may be an included angle such as 30 degrees, 45 degrees, or 60 degrees between the connection line between same positions of the two optical cavity mirrors of the second optical cavity 92 and the center line 100. A specific value of the included angle may be determined based on an actual situation, and is not limited in this embodiment of this application.

The second optical cavity 92 is located between the ground electrode pair 94 and the radio frequency electrode pair 95. To be specific, one optical cavity mirror of the second optical cavity 92 is distributed in an included angle formed between one ground electrode of the ground electrode pair 94 and one radio frequency electrode of the adjacent radio frequency electrode pair 95, the other optical cavity mirror of the second optical cavity 92 is located in an included angle formed between the other ground electrode of the ground electrode pair 94 and the other radio frequency electrode of the radio frequency electrode pair 95. The second optical cavity 92 may be used to obtain the quantum information in the single ion in the ion trap system.

FIG. 8 and FIG. 9 show the following example for description. There are one first optical cavity 91, two second optical cavities 92, one direct current electrode pair 93, one ground electrode pair 94, and one radio frequency electrode pair 95; there are eight ions axially arranged in the ion trap system; and the connection line between the two optical cavity mirrors of the second optical cavity 92 is perpendicular to the center line 100. It should be noted that a quantity of second optical cavities 92 may be equal to or less than a quantity of ions in the ion trap system, and that the quantity of ions is not limited to 8, and there may be hundreds of ions or more ions. Therefore, in this embodiment of this application, specific quantities of second optical cavities 92, direct current electrode pairs 93, ground electrode pairs 94, radio frequency electrode pairs 95, and ions may be set based on an actual situation. This is not limited in this embodiment of this application.

Optionally, in this embodiment of this application, the ion-optical cavity coupling system is disposed in a vacuum cavity. After the ion-optical cavity coupling system is placed in the vacuum cavity, a vacuum pump group may be used to vacuum the ion-optical cavity coupling system. Each electrode in the ion-optical cavity coupling system in the vacuum cavity is connected to an external power supply through a lead.

A direct current signal input to the direct current electrode pair 93 in the ion trap system is generated by amplifying, by an amplifier, a signal that is generated by a voltage source; and an alternating current signal input to the radio frequency electrode pair 95 in the ion trap system is generated by amplifying, by an amplifier, a signal that is generated by a signal source.

Optionally, in this embodiment of this application, the at least one ion confined in the ion trap system may be arranged along the z-axis direction, that is, the at least one ion may be arranged in the space constituted by the direct current electrode pair 93, the ground electrode pair 94, and the radio frequency electrode pair 95.

Optionally, a spacing between every two ions of the at least one ion is approximately 5 micron (us). Each of the foregoing ions is generally selected from a metal element, for example, calcium (Ca) or beryllium (Be), in alkaline earth metals (that is, earthy elements) in a periodic table of elements. Alternatively, each of the foregoing ions may be selected from a transition metal element with two electrons outside the nucleus, for example, ytterbium (Yb) or cadmium (Cd). Because a neutral atom cannot sense an electric field force, laser light needs to be used to excite an electron outside the atom in the selected metal element, so as to make the electron be detached from the nucleus to form an ion.

It should be noted that ions may be selected from different elements. Therefore, lasers with different wavelengths need to be selected for the selected different metal elements, and electrons outside the metal elements are excited by using laser light emitted by the lasers with different wavelengths, so that the electrons are detached from the nucleus. For example, when the metal element calcium of the alkaline earths is selected, a 423-nm laser and a 375-nm laser need to be used to act on a calcium atom at the same time, so as to obtain a calcium ion.

It can be learned from the foregoing description that the direct current electrode pair 93 in the ion trap system may trap an ion in the ion trap system in the z direction. The two direct current (DC) electrodes of the direct current electrode pair 93 are oppositely disposed at two ends of the first optical cavity 91. A distance between the two direct current electrodes of the direct current electrode pair 93 is generally several millimeters, and a voltage is generally tens of voltages. A trap electric potential field of 100 KHz can be generated in the z direction in such an electrode frame. In the ion trap system, the radio frequency electrode pair 95 (the two radio frequency RF alternating current electrodes) and the ground electrode pair 94 (the two ground GND electrodes) are arranged along the xy directions. A spacing between each pair of electrodes is approximately 2 millimeters. A frequency of a radio frequency alternating current ranges, optionally, 20-50 MHz, and a voltage is generally hundreds of voltages. Therefore, it may be calculated, based on the foregoing parameters, that a trap electric potential field of 1 MHz may be generated in the xy directions. Therefore, a trap electric potential field is generated in each of the three directions, and an ion can be confined in each of the three directions.

Optionally, in the ion trap system, each form of electrode is generally made of tungsten wires, and is straightened into a cylindrical shape with a diameter of approximately 1 millimeter.

Optionally, in this embodiment of this application, when there are at least two ions in the ion trap system, the beam waist radius of the first optical cavity 91 and the beam waist radius of the second optical cavity 92 need to satisfy the following condition:

the beam waist radius of the first optical cavity 91 is greater than a spacing between two adjacent ions of at least two ions, and the beam waist radius of the second optical cavity 92 is less than or equal to the spacing between two adjacent ions in the at least two ions.

In this way, the first optical cavity 91 may be coupled to all the ions in the ion trap, and the second optical cavity 92 can be used to position and obtain a single ion in the ion trap system.

Specifically, the first optical cavity 91 and the second optical cavity 92 are respectively distributed in the z direction and a direction perpendicular to the z direction. In the z direction, a first optical cavity mirror of the first optical cavity 91 is coated with a first reflection film, and a second optical cavity mirror of the first optical cavity 91 is coated with a second reflection film. The first optical cavity 91 is used to read and store the quantum optical signal. A distance between the two optical cavity mirrors of the first optical cavity 91 is approximately 1 millimeter, and the beam waist radius of the first optical cavity 91 may be approximately 50 microns. On an xy plane (perpendicular to the z direction), a first optical cavity mirror of the second optical cavity 92 (there are one or more second optical cavities 92) is coated with the first reflection film, and a second optical cavity mirror of the second optical cavity 92 is coated with the second reflection film. The second optical cavity 92 is used to read the quantum information from a confined ion. A distance between the two optical cavity mirrors of the second optical cavity 92 is approximately 300 microns, and the beam waist radius of the second optical cavity 92 may reach approximately 5 microns. In comparison, the beam waist radius of the second optical cavity 92 may be the same as a spacing between two ions. If the spacing between two ions is 5 microns, the second optical cavity 92 whose beam waist radius is 5 microns may act on a single ion, so as to address and obtain the single ion.

Optionally, when there are more than two ions, spacings between adjacent ions are the same.

In this embodiment of this application, that the first optical cavity 91 is used to obtain a quantum optical signal, and send the quantum optical signal to the ion trap system, to enable quantum information of the quantum optical signal to be transferred to a single ion in the ion trap system is specifically:

the first optical cavity 91 is used to send the obtained quantum optical signal to the ion trap system; and after the quantum optical signal is enabled to be absorbed by the at least one ion in the ion trap system, and sequentially transfer the quantum information of the quantum optical signal to a collective excited state and an excited state of a collective motion mode of the at least one ion, and then transfer the quantum information of the quantum optical signal from the excited state of the collective motion mode to an excited state of the single ion in the ion trap system.

Optionally, in the ion-optical cavity coupling system in this embodiment of this application, when the first optical cavity 91 is used to obtain the quantum optical signal from the outside and send the quantum optical signal to the ion trap system, after the at least one ion in the ion trap system absorbs the quantum optical signal, these ions change from a ground state to a collective excited state. Therefore, the quantum information of the quantum optical signal is first transferred to the collective excited state of these ions. Specifically, $|0\rangle=|0_1 0_2 \ldots 0_N\rangle \rightarrow |1\rangle = \Sigma_i g_i |0_1 0_2 \ldots 1_i \ldots 0_N\rangle$ is used for representation, where $|0\rangle$ represents that all the ions in the ion trap system are in the ground state, $|0_1 0_2 \ldots 0_N\rangle$ represents that all the ions 1 to N included in the ion trap system are in the ground state, $|1\rangle$ represents that the ions in the ion trap system are in the collective excited state, and $\Sigma_i g_i |0_1 0_2 \ldots 1_i \ldots 0_N\rangle$ represents that the quantum information of the quantum optical signal is transferred to the collective excited state of the at least one ion after the quantum optical signal is absorbed by the at least one ion. In this case, the quantum information may be in any one of the at least one ion, and may be transferred between ions of the at least one ion. In addition, $0 \leq i \leq N$, i represents an integer, and $g_i$ represents a strength of coupling between each ion in the ion trap system and the first optical cavity 91.

Figure 10:
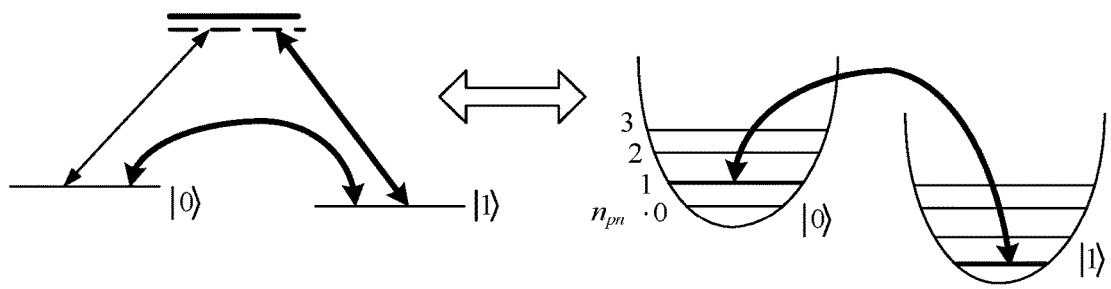
FIG. 10 is a schematic diagram of a change of energy levels for which an ion is coupled to an optical cavity.

Then, the quantum information of the quantum optical signal is transferred from the collective excited state of the ion to an excited state of a collective motion mode of the ion. For details, refer to FIG. 10. FIG. 10 is a schematic diagram of a change of energy levels for which an ion is coupled to an optical cavity. As shown in FIG. 10, a left diagram shows energy levels of an ion, where the ion may transit from an energy level of a ground state to an energy level of an excited state by executing a dual-color Raman virtual process; and a right diagram shows energy levels of a motion mode of the ion trap system, where an energy spacing between energy levels is far less than an energy spacing between energy levels of the ion. Therefore, the ion trap system may also implement state transferring by executing a stimulated Raman process, that is, $|1, n_{ph}=0\rangle \rightarrow |0, n_{ph}=1\rangle$, where $n_{ph}$ represents a motion mode of an ion, 0 represents a ground mode, and 1 represents an excited mode. Therefore, 1 in $|1, n_{ph}=0\rangle$ indicates that ions in the ion trap system are in the collective excited state, and $n_{ph}=0$ indicates that no ions in the ion trap system are in the excited state of the collective motion mode; and 0 in $|0, n_{ph}=1\rangle$ indicates that no ions in the ion trap system are in the collective excited state, and $n_{ph}=1$ indicates that the ions in the ion trap system are in the excited state of the collective motion mode. Therefore, $|1, n_{ph}=0\rangle \rightarrow |0, n_{ph}=1\rangle$ indicates that quantum information in a photon is transferred from the collective excited state of the at least one ion to the excited state of the collective motion mode. Thus, all the ions in the ion trap return to the ground state.

Finally, the quantum information in the photon is transferred from the excited state of the collective motion mode of the at least one ion back to the excited state of the single ion, that is, $|0, n_{ph}=1\rangle \rightarrow |0_1 \ldots 1_j \ldots 0_N, n_{ph}=0\rangle$. The quantum information in the photon is transferred to a $j^{th}$ ion, where $0 \leq j \leq N$, and j is an integer.

Therefore, in this embodiment, after the quantum information is transferred from the external quantum optical signal to the ion in the ion trap system, an operation may be performed inside an ion chain, to enable the quantum information to be transferred to the excited state of the single ion (that is, a state of an ion in the ion chain changes to an excited state or a state of an ion in the ion chain changes to a superposition state, and the remaining ions are in a ground state. In this embodiment, that a state of one ion changes to an excited state is used as an example for description). Optionally, the excited state of the single ion may be represented as: $\cos \alpha |0\rangle + e^{i\varphi} \sin \alpha |1\rangle$.

Optionally, in this embodiment of this application, that the second optical cavity 92 is used to obtain the quantum information in the single ion in the ion trap system may be specifically explained as follows:

the second optical cavity 92 is used to position the single ion in the ion trap system by using laser light, to obtain the quantum information in the single ion.

Optionally, in this embodiment of this application, a spacing between ions is usually 5 microns, and the beam waist radius of the second optical cavity 92 may also 5 microns. Therefore, an ion in the ion trap system can be positioned by using laser light and the second optical cavity 92, and further separate coupling to the single ion in the ion trap system is implemented without affecting a state of another ion. Therefore, the second optical cavity 92 can obtain the quantum information in the single ion in the ion trap system, that is, the second optical cavity 92 can implement a function of addressing the single ion.

Optionally, in the ion trap system described in this embodiment of this application, both a strength of coupling between the first optical cavity 91 and any one of the at least one ion and a strength of coupling between the second optical cavity 92 and any one of the at least one ion are represented by $g_0$, and $g_0$ may be represented by the following formula:

$$g_0 = \sqrt{\frac{3c\gamma\lambda^2}{\pi^2 L \omega_0^2}}$$

c represents a speed of light, L represents a length of the first optical cavity 91 or the second optical cavity 92, $\omega_0$ represents the beam waist radius of the first optical cavity 91 or the second optical cavity 92, $\lambda$ represents a wavelength of the quantum optical signal, and $\gamma$ represents a spontaneous emission rate of an ion. It can be learned from the formula that a larger volume of an optical cavity, that is, a longer length of the optical cavity and a larger beam waist radius of the optical cavity, indicates a weaker strength of coupling between the optical cavity and an ion.

Optionally, to determine whether the optical cavity and the ion are coherently coupled to each other, in other words, to determine whether a coupling strength is far greater than losses of the optical cavity and the ion, a parameter C is introduced to this embodiment of this application to indicate whether the optical cavity and the ion are strongly coupled. For example, $$C = \frac{g^2}{2k\gamma} \gg 1$$

represents strong coupling. That is, if C is far greater than 1, it indicates that the strength of coupling between the optical cavity and the ion is far greater than the losses of the optical cavity and the ion. In this case, interaction between light and the ion is explained as a coherent operation, that is, no errors are introduced during transferring the quantum information between the quantum optical signal and the ion.

Optionally, g in $$C = \frac{g^2}{2k\gamma}$$

represents the strength of coupling between the optical cavity and the ion; $\gamma$ represents the spontaneous emission rate of the ion, that is, a loss of the ion; k represents a loss of the optical cavity; and $$k = \frac{2\pi c}{4L\mathcal{F}},$$

where $\mathcal{F}$ represents fineness of the optical cavity, L represents the length of the optical cavity, and c represents the speed of light.

For example, in actual application, typical experimental values of the first optical cavity 91 is (g, k, $\gamma$)=2π×(1.4,0.05, 11.4) MHz, and C=1.7 may be obtained by substituting the typical experimental values into $$C = \frac{g^2}{2k\gamma}.$$

Therefore, in the case of the typical experimental values, the strength of coupling between the first optical cavity 91 and the ion cannot satisfy the condition that the strength of coupling between the first optical cavity 91 and the ion is far greater than the losses of the optical cavity and the ion. In this case, the first optical cavity 91 and the ion are incoherently coupled. However, if the first optical cavity 91 is axially coupled to the ion chain in the ion trap system, the first optical cavity 91 may be coupled to a plurality of ions. Therefore, the strength of coupling between the first optical cavity 91 and the ions increases as a quantity of the ions increases.

Optionally, in this embodiment of this application, a total strength $g_N$ of coupling between the first optical cavity 91 and all the ions in the ion trap system is expressed by the following formula: $g_N=\sqrt{N}g_0$, where N represents a total quantity of ions in the ion trap system.

Optionally, if typical experimental parameters such as N=53 and $g_0$=2π×1.4 MHz are used, $g_N$=2π×10.2 MHz. Correspondingly, (g, k, $\gamma$)=2π×(10.2,0.05,11.4) MHz, and therefore, $C_N$=91. In this case, the obtained strength of coupling between the first optical cavity 91 and the ions is far greater than the losses of the optical cavity and the ions, so that the first optical cavity 91 is axially coherently coupled to the ions in the ion trap system.

Optionally, for a smaller optical cavity, that is, for the second optical cavity 92 with a smaller length and a smaller beam waist radius, optionally, the length L of the second optical cavity 92 is equal to 100 µs, and the beam waist radius of the second optical cavity 92 is $\omega_0$=4 µs. When a single ion in the ion trap system is coupled to the second optical cavity 92, the strength of coupling between the second optical cavity 92 and the single ion may be represented by $$g_0 = \sqrt{\frac{3c\gamma\lambda^2}{\pi^2 L\omega_0^2}}.$$

For example, when the length L of the second optical cavity 92 is equal to 100 µs, and the beam waist radius is $\omega_0$=4 µs, in actual application, it may be estimated that (g, k, $\gamma$)=2π×(6.3,0.1,11.4) MHz. Correspondingly, it may be obtained that C=17.5.

It can be learned that when the second optical cavity 92 is used, strong coupling can be achieved without overall enhancement of coupling between the ion and the second optical cavity 92, that is, the strength of coupling between the second optical cavity 92 and the ion is far greater than the losses of the second optical cavity 92 and the ion. The second optical cavity 92 is coupled to the ion, and the quantum information in the excited state in the single ion may be transferred as the quantum information of the quantum optical signal by using dual-color Raman light that is incident from outside of the second optical cavity 92, so that the quantum information is read out of the ion trap.

According to the ion-optical cavity coupling system provided in this embodiment of this application, the first optical cavity is used to obtain the quantum optical signal, and send the quantum optical signal to the ion trap system, to enable the quantum information of the quantum optical signal to be absorbed by the at least one ion in the ion trap system, and the quantum information is transferred to the collective excited state and the excited state of the collective motion mode of the at least one ion, that is, transferred to an electronic state inside the ion; then, quantum computation processing is performed to transfer the quantum signal to the excited state of the single ion in the ion trap; and finally, the second optical cavity is used to position the single ion in the ion trap, and the quantum information of the quantum optical signal is emitted from the second optical cavity. In this technical solution, the quantum optical signal enters the ion trap system from the first optical cavity, and is emitted from the second optical cavity. This improves efficiency of quantum state transferring between an ion and a photon.

In this embodiment, coupling between the first optical cavity 91 and the ion and coupling between the second optical cavity 92 and the ion are both strong coupling, so that completely coherent transferring between quantum states is achieved.

Optionally, in the ion-optical cavity coupling system provided in this embodiment of this application, one optical cavity mirror of the first optical cavity 91 and one optical cavity mirror of the second optical cavity 92 are both coated with the first reflection film, the other optical cavity mirror of the first optical cavity 91 and the other optical cavity mirror of the second optical cavity 92 are both coated with the second reflection film, a reflectivity of the first reflection film falls within a first preset range, a reflectivity of the second reflection film falls within a second preset range, and a maximum value of the first preset range is less than a minimum value of the second preset range.

Optionally, in this embodiment, the quantum optical signal is incident to the ion trap system from the first optical cavity mirror of the first optical cavity 91, and the first optical cavity mirror is coated with the first reflection film. Optionally, the reflectivity of the first reflection film cannot be excessively high (for example, approximate 99% is relatively appropriate), so that the quantum optical signal can be relatively easily incident to the ion trap system from the first optical cavity 91. The quantum optical signal interacts with an ion (absorbed by the ion) in the ion trap system, and light that fails to be absorbed by the ion is transmitted to the second optical cavity mirror of the first optical cavity 91. The second optical cavity mirror is coated with the second reflection film. Optionally, a higher reflectivity (optionally, generally above 99.99%) of the second reflection film is better. In this way, the quantum optical signal transmitted to the second optical cavity mirror of the first optical cavity 91 is reflected back to the ion trap system and continues to interact with the ion. Therefore, the quantum optical signal can be reflected back and forth between the two optical cavity mirrors of the first optical cavity 91, and repeatedly interacts with the ion, so that a probability of interaction between the quantum optical signal and the ion in the ion trap system is increased, that is, the quantum optical signal can be fully absorbed by the ion in the ion trap system. After the ion absorbs the quantum optical signal, the quantum information of the quantum optical signal is first transferred to the collective excited state of all the ions in the ion trap system, and then transferred to the excited state of the collective motion mode. Finally, by addressing the single ion, the quantum information is transferred from the excited state of the collective motion mode of the ions to the excited state (an internal quantum state) of the single ion. In this way, the quantum information of the quantum optical signal is transferred to the excited state of the single ion in the ion trap system by using the first optical cavity 91.

Optionally, because the first optical cavity mirror of the second optical cavity 92 is coated with the first reflection film, and the second optical cavity mirror of the second optical cavity 92 is coated with the second reflection film, the single ion in the ion trap system can be addressed by using laser light and the first optical cavity mirror that is coated with the first reflection film, that is, the single ion can be addressed by using the laser light and by using the second optical cavity 92, so that the quantum information in the single ion is transferred to a photon quantum state by using the second optical cavity 92. Finally, the quantum information in the quantum state of the photon is read out of the ion trap system by using the first optical cavity mirror of the second optical cavity 92. The quantum information of the quantum optical signal is read into and read out by using the first optical cavity 91 and the second optical cavity 92, thereby implementing transferring of information in ions.

For example, with reference to the foregoing content, the following describes the technical solution in the embodiments of this application in detail.

Figure 11:
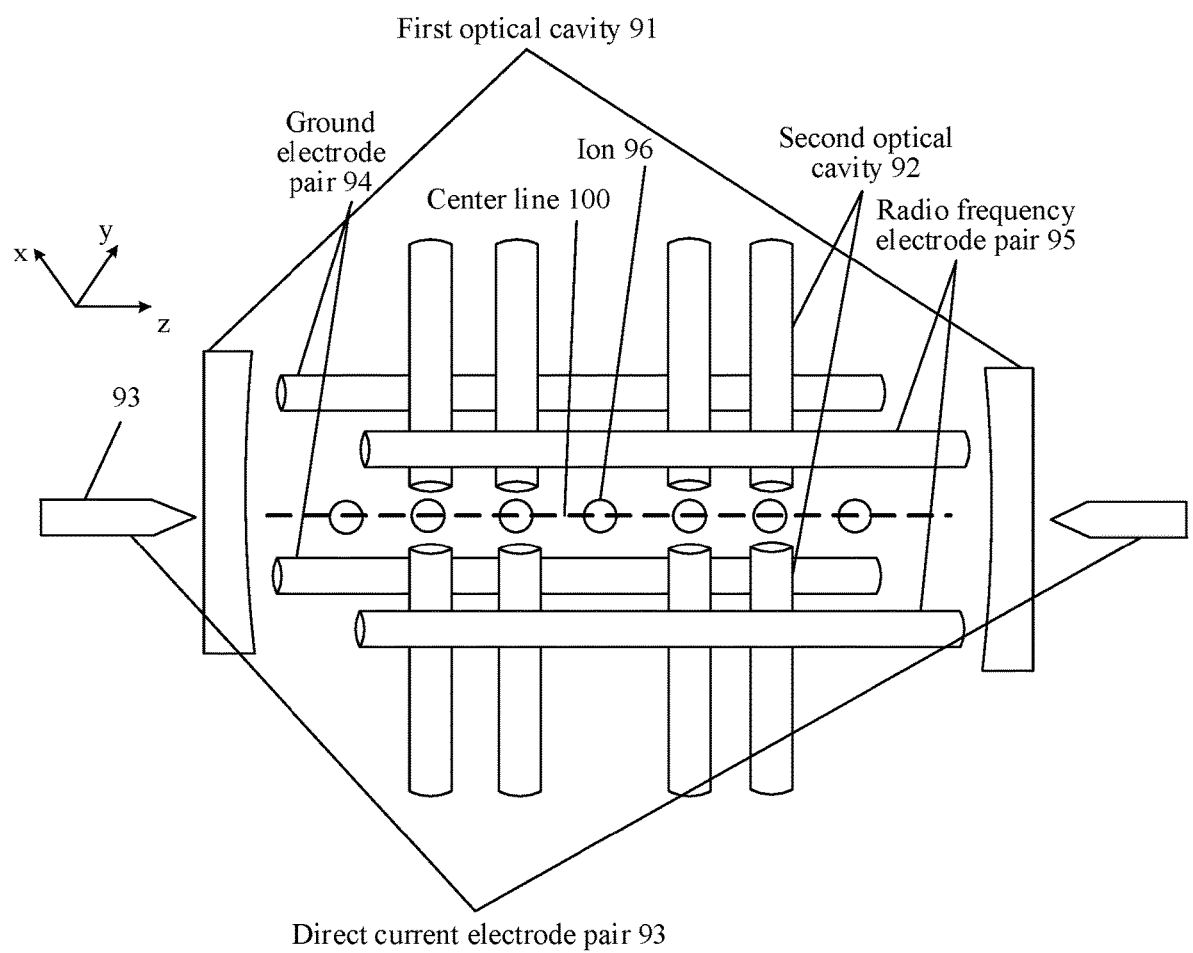
FIG. 11 is a schematic diagram of transmission of a quantum optical signal in an ion-optical cavity coupling system.

FIG. 11 is a schematic diagram of transmission of a quantum optical signal in an ion-optical cavity coupling system. The following first describes a function of each part in the ion-optical cavity coupling system in detail. This embodiment is described by using common xyz space distribution for description. As shown in FIG. 11, for example, the ion-optical cavity coupling system includes: one first optical cavity 91, four second optical cavities 92, one direct current electrode pair 93, one radio frequency electrode pair 95, and one ground electrode pair 94.

Optionally, as shown in FIG. 11, a connection line between centers of two optical cavity mirrors of the first optical cavity 91 is parallel to a z-axis, and a manufacturing material of the two optical cavity mirrors of the first optical cavity 91 may be silicon dioxide. Each optical cavity mirror of the first optical cavity 91 is polished, and is coated with a reflection film, and the reflection film is enabled to reflect ultraviolet light. Optionally, a distance between the two optical cavity mirrors of the first optical cavity 91 is approximately 2 millimeters, and a beam waist radius of the first optical cavity 91 may be approximately 100 microns.

Optionally, a connection line between centers of two optical cavity mirrors of the second optical cavity 92 is perpendicular to the z axis. Each second optical cavity 92 may be made of an optical fiber, and may be referred to as an optical fiber optical cavity. A plurality of second optical cavities 92 form an optical fiber optical cavity array. Each second optical cavity 92 in the optical fiber optical cavity array may correspond to one ion 96 at a same moment, and at a different moment, the second optical cavity 92 may further correspond to another ion (only four second optical cavities 92 are shown in the figure, and actually, a quantity of second optical cavities 92 may be an integer greater than or equal to 1 and less than or equal to a total quantity of ions). In actual application, the second optical cavity 92 (i.e., the optical fiber optical cavity) may be made of a standard bare optical fiber, or may be made of an optical fiber whose mode is consistent with an optical mode.

For example, when the second optical cavity 92 is made of a standard ultraviolet optical fiber, optionally, a carbon dioxide laser is first focused on a surface of an optical fiber section, to process a required optical fiber section radius. For example, a second optical cavity 92 with a spherical radius of 150 microns is manufactured, a typical value of a beam waist radius may reach 5 microns, and a spacing between every two second optical cavities 92 (that is, a distance between the two optical cavity mirrors of the second optical cavity 92) is 300 microns.

Optionally, an electric potential of an ion trap system is mainly implemented by using six electrodes with different voltages and directions. A direct current electrode pair 93 is placed in a direction (e.g., the z direction) of the connection line between the centers of two optical cavity mirrors of the first optical cavity 91. A distance between two direct current electrodes of the direct current electrode pair 93 is several millimeters (optionally, 3 millimeters). A same direct current voltage is applied to each direct current electrode, and a voltage ranging from 10 V to 50 V may be selected based on a required electric potential. In this embodiment, because an ion needs to be weakly confined in the z direction, a relatively small voltage is selected. Optionally, a voltage of 20 V may be applied to each direct current electrode, so that a 100-KHz confinement potential energy may be generated in the z direction.

Correspondingly, one radio frequency electrode pair 95 and one ground electrode pair 94 are respectively placed in directions (e.g., in xy directions) perpendicular to the connection line between the centers of the two optical cavity mirrors of the first optical cavity 91. A voltage applied to a radio frequency electrode is generally a high voltage ranging from 200 V to 500 V, and a frequency ranges from 30 MHz to 40 MHz. Optionally, in this embodiment of this application, a 35-MHz alternating current signal and a 300-V alternating current voltage may be used for implementation. A distance between two radio frequency electrodes of the radio frequency electrode pair 95 and two ground electrodes of the ground electrode pair 94 may be 1 millimeter, so that a 1-MHz confinement potential energy may be generated in the xy directions.

Optionally, the radio frequency electrode pair 95 and the ground electrode pair 94, which are made of tungsten wires, may be straightened into a cylindrical shape, and tips of the direct current electrode pair 93 may be made of the cylindrical electrode through electrochemical corrosion. Specifically, an angle of the tip of each direct current electrode of the direct current electrode pair 93 can be controlled by controlling a speed of electrochemical corrosion.

Optionally, the ion-optical cavity coupling system in FIG. 11 needs to be placed in a superconducting vacuum cavity, and a vacuum pump is used to vacuum the ion-optical cavity coupling system, to reach a vacuum degree of 10^(−11) millibar (mbar). All electrical signals in the system are implemented by connecting an external power supply to the vacuum electrode through a vacuum lead. A radio frequency electrical signal is generated by a microwave source of a corresponding frequency. Because the microwave source cannot generate a high voltage of 300 V, an external radio frequency amplifier is used to implement a voltage amplification function. For example, a helical resonator is used to implement this function. A direct current signal may be generated by using a voltage source, and then a direct current signal with a voltage of 20 V is obtained by using a power amplifier.

Optionally, in this embodiment, a current source is used to heat a metal tube in which a corresponding atom is placed, so that the atom evaporates and is ejected from the metal tube. Then, ionized laser light is used to act on the ejected atom beam, to remove an electron outside the atom, so that an ion is obtained. The obtained ion can sense an external electric field, so that a one-dimensional chain structure is formed in the ion trap system through regular arrangement.

Optionally, after all the electrical signals and the vacuum state in the ion-optical cavity coupling system satisfy a requirement, the system may start to obtain an external quantum optical signal, to enable the quantum optical signal to be incident from the first optical cavity mirror of the first optical cavity 91, and interact with an ion chain in the ion trap system after the quantum optical signal passes through the first optical cavity mirror.

In this embodiment, a wavelength of the quantum optical signal is the same as a spacing between energy levels of ions, and is also completely the same as a light field mode of the first optical cavity 91. Therefore, there is a resonance enhancement effect, so that absorption of the quantum optical signal is enhanced. After the ions absorb the quantum optical signal, quantum information of the quantum optical signal is coherently transferred to a collective excited state of the ions, that is $|0\rangle = |0_1 0_2 \ldots 0_N\rangle \to |1\rangle = \Sigma_i g_i |0_1 0_2 \ldots 0_N\rangle$; then the quantum information is transferred from the collective excited state of the ions to an excited state of a collective motion mode of the ions by using dual-color Raman laser light, that is $|1, n_{ph}=0\rangle \to |0, n_{ph}=1\rangle$; and finally, the quantum information is transferred from the excited state of the collective motion mode of the ions to an excited state of a single ion still by using the dual-color Raman laser method, that is, $|0, n_{ph}=1\rangle \to |0_1 \ldots 1_j \ldots 0_N, n_{ph}=0\rangle$. Therefore, a coherent absorption process of the quantum information in the ion chain is completed.

Optionally, after the quantum information absorption process in the ions is completed, the ions in the ion trap system may continue to perform quantum information processing based on the absorbed quantum information. After a quantum information processing task is completed, the obtained quantum information is further stored in an excited state of an ion. When the quantum information needs to be read out, the excited state of the ion may be directly transferred to a photon quantum state by using the corresponding second optical cavity 92, that is, $(\cos \alpha |s\rangle + e^{i\varphi} \sin \alpha |s'\rangle) \otimes |0\rangle \to |D\rangle \otimes (\cos \alpha |H\rangle + e^{i\varphi} \sin \alpha |V\rangle)$, so that the quantum information is read out of the ion trap system.

In conclusion, the ion-optical cavity coupling system implements receiving of the quantum optical signal, processing of the quantum information of the quantum optical signal, and readout of the quantum optical signal.

In this embodiment of this application, the first optical cavity and the second optical cavity are used to be coupled to ions, and addressing for a single ion is implemented. In addition, because the beam waist radius of the second optical cavity is extremely small, the second optical cavity may act only on the single ion without affecting a state of another ion. The first optical cavity implements enhancement of a strength of coupling between an ion and the optical cavity. In this structure, strong coupling between the cavity and the ion and addressing for the single ion are both achieved.

In addition, a biggest advantage of the ion-optical cavity coupling system is that there is no movable optical element. However, as described above that an ion performs harmonic motion in the ion trap system, and in particular, micro motion changes an equilibrium position of the ion, consequently the ion is no longer located at a central position $$r_i(t) \approx \bar{r}_i \cos(\omega_i t)\left(1 + \frac{q_i}{2}\cos(\Omega_{RF} t)\right)$$

of the second optical cavity. Therefore, the micro motion of the ion may be minimized by adjusting a voltage of an external compensation electrode, that is, qi is enabled to be maximally close 0. In this way, a communication ion that needs to transmit the quantum information can be located at the center of the second optical cavity, thereby improving coupling efficiency.

In the ion-optical cavity coupling system in this embodiment of this application, the ions are coupled to different optical cavities, and the quantum optical signal is obtained and read out. This reduces a half loss caused by reading the quantum optical signal into an optical cavity and reading the quantum optical signal out of the same optical cavity. In addition, the system implements both enhancement of the strength of coupling between the ion and the optical cavity and addressing for the single ion. Moreover, complexity of read-in and read-out operations of the quantum optical signal is reduced in the system.

Figure 12:
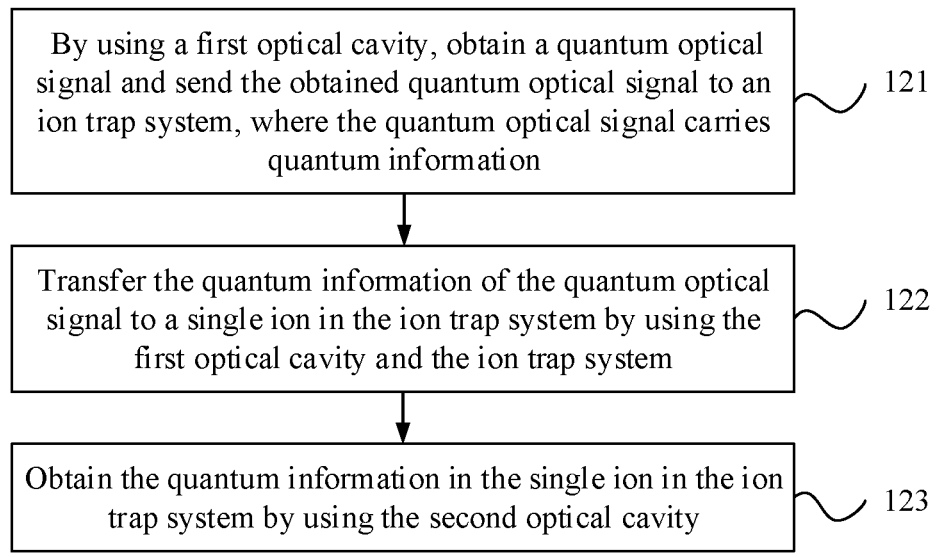
FIG. 12 is a schematic flowchart of an embodiment of an ion-optical cavity coupling method according to an embodiment of this application.

Further, FIG. 12 is a schematic flowchart of an embodiment of an ion-optical cavity coupling method according to an embodiment of this application. The ion-optical cavity coupling method is applicable to an ion-optical cavity coupling system. The ion-optical cavity coupling system includes: a first optical cavity, a second optical cavity, and an ion trap system. The ion trap system includes a direct current electrode pair, a ground electrode pair, and a radio frequency electrode pair. At least one ion is arranged in the ion trap system, a straight line on which an equilibrium position of the at least one ion is located is a center line, and the center line is perpendicular to two optical cavity mirrors of the first optical cavity. The two optical cavity mirrors of the first optical cavity are symmetrically distributed on two sides of the at least one ion, two optical cavity mirrors of the second optical cavity are distributed in space constituted by the two optical cavity mirrors of the first optical cavity, and there is an included angle between the second optical cavity and the center line. Two direct current electrodes of the direct current electrode pair are symmetrically distributed on outer sides of the two optical cavity mirrors of the first optical cavity, and the ground electrode pair and the radio frequency electrode pair are distributed in the space constituted by the two optical cavity mirrors of the first optical cavity.

Optionally, referring to FIG. 12, the ion-optical cavity coupling method may include the following steps:

Step 121: By using the first optical cavity, obtain a quantum optical signal and send the obtained quantum optical signal to the ion trap system, where the quantum optical signal carries quantum information.

Optionally, in this embodiment of this application, the first optical cavity is used to obtain the external quantum optical signal by using one optical cavity mirror, where the optical cavity mirror is coated with a first reflection film, and the first reflection film may allow the quantum optical signal to pass through. Therefore, the first optical cavity may be used to send the obtained quantum optical signal to the ion trap system. In this embodiment of this application, the quantum information of the quantum optical signal needs to be used to transfer information in an ion, and therefore, the quantum optical signal carries the quantum information.

Step 122: Transfer the quantum information of the quantum optical signal to a single ion in the ion trap system by using the first optical cavity and the ion trap system.

At least one ion is arranged on the center line and in space constituted by the direct current electrode pair, the ground electrode pair, and the radio frequency electrode pair in the ion trap system.

Optionally, in this embodiment of this application, the quantum optical signal is incident to the ion trap system through one optical cavity mirror of the first optical cavity; and the at least one ion is arranged on the center line and in the space constituted by the direct current electrode pair, the ground electrode pair, and the radio frequency electrode pair in the ion trap system. Therefore, the quantum optical signal that is incident to the ion trap system may interact with an ion (e.g., be absorbed by the ion) in the ion trap system, and light that is not absorbed by the ion is transmitted to the other optical cavity mirror of the first optical cavity. The other optical cavity mirror is coated with a second reflection film, and the second reflection film can prevent the quantum optical signal from being emitted out from the ion trap system through the other optical cavity mirror.

Therefore, under a confinement effect produced by the direct current electrode pair, the radio frequency electrode pair, and the ground electrode pair in the ion trap system, the quantum optical signal can be reflected back and forth between the two optical cavity mirrors of the first optical cavity, and interact with the ion repeatedly. This increases a probability of interaction between the quantum optical signal and the ion in the ion trap system.

Specifically, step 122, where the quantum information of the quantum optical signal is transferred to the single ion in the ion trap system by using the first optical cavity and the ion trap system, may be specifically explained as follows:

enabling the quantum optical signal to be absorbed by the at least one ion in the ion trap system under the confinement effect of the ion trap system by using the first optical cavity, and sequentially transferring the quantum information of the quantum optical signal to a collective excited state and an excited state of a collective motion mode of the at least one ion, and then transferring the quantum information of the quantum optical signal from the excited state of the collective motion mode to an excited state of the single ion in the ion trap system.

Optionally, after the at least one ion in the ion trap system absorbs the quantum optical signal, a state of the ions changes from a ground state to the collective excited state. Therefore, the quantum information of the quantum optical signal is first transferred to the collective excited state of the at least one ion. The ions in the ion trap system interact with each other, and the quantum information of the quantum optical signal is transferred from the collective excited state of the ions to the excited state of the collective motion mode of the ions, and then is transferred from the excited state of the collective motion mode of the ions back to the excited state of the single ion.

Step 123: Obtain the quantum information in the single ion in the ion trap system by using the second optical cavity.

Optionally, in this embodiment of this application, a beam waist radius of the second optical cavity may be the same as a spacing between two ions. Therefore, the quantum information in the single ion in the ion trap system may be obtained by using the second optical cavity.

Specifically, step 123, including obtaining the quantum information in the single ion in the ion trap system by using the second optical cavity, may be specifically explained as the following steps.

Step A1: Position the single ion in the ion trap system by using laser light and the second optical cavity.

Step A2: Obtain the quantum information in the single ion by using the second optical cavity.

Optionally, the beam waist radius of the second optical cavity may be the same as the spacing between two ions, and therefore, the single ion in the ion trap system can be positioned by using laser light and the second optical cavity, and further separate coupling to the single ion in the ion trap system is implemented without affecting a state of another ion. Therefore, the second optical cavity can be used to obtain the quantum information in the single ion in the ion trap system, that is, the second optical cavity can be used to implement a function of addressing the single ion.

Optionally, for information that is not disclosed in the ion-optical cavity coupling method provided in this embodiment of this application, refer to the descriptions of the ion-optical cavity coupling system shown in FIG. 8 to FIG. 11. Details are not described herein again.

According to the ion-optical cavity coupling method provided in this embodiment of this application, first, the first optical cavity is used to obtain the quantum optical signal, and send the obtained quantum optical signal to the ion trap system, where the quantum optical signal carries the quantum information; then, the quantum information of the quantum optical signal is transferred to the single ion in the ion trap system by using the first optical cavity and the ion trap system; and finally, the second optical cavity is used to obtain the quantum information in the single ion in the ion trap system. In this technical solution, the quantum optical signal enters the ion trap system from the first optical cavity, and is emitted from the second optical cavity. This reduces a half loss caused by reading the quantum optical signal into an optical cavity and reading the quantum optical signal out of the same optical cavity, and improves transfer efficiency of quantum states of an ion and a photon.

Optionally, in a possible implementation of this embodiment of this application, in the ion trap system, both a strength of coupling between the first optical cavity and any one of the at least one ion and a strength of coupling between the second optical cavity and any one of the at least one ion are represented by $g_0$, and $g_0$ is expressed by the following formula:

$$g_0 = \sqrt{\frac{3c\gamma\lambda^2}{\pi^2 L \omega_0^2}}$$

where c represents a speed of light, L represents a length of the first optical cavity or the second optical cavity, $\omega_0$ represents a beam waist radius of the first optical cavity or the second optical cavity, $\lambda$ represents a wavelength of the quantum optical signal, and $\gamma$ represents a spontaneous emission rate of an ion.

Optionally, a total strength $g_N$ of coupling between the first optical cavity and all ions in the ion trap system is expressed by the following formula:

$$g_N = \sqrt{N} g_0$$

where N represents a total quantity of ions in the ion trap system.

Optionally, in another possible implementation of this embodiment of this application, both a first optical cavity mirror of the first optical cavity and a first optical cavity mirror of the second optical cavity are coated with the first reflection film, and both a second optical cavity mirror of the first optical cavity and a second optical cavity mirror of the second optical cavity are coated with the second reflection film.

A reflectivity of the first reflection film falls within a first preset range, a reflectivity of the second reflection film falls within a second preset range, and a maximum value of the first preset range is less than a minimum value of the second preset range.

Optionally, in still another possible implementation of this embodiment of this application, distances between the two optical cavity mirrors of the second optical cavity and the center line are the same. Two ground electrodes of the ground electrode pair are symmetrically distributed on two sides of the center line, and two radio frequency electrodes of the radio frequency electrode pair are symmetrically distributed on the two sides of the center line. A connection line between the two direct current electrodes of the direct current electrode pair is parallel to the center line.

Optionally, in yet another possible implementation of this embodiment of this application, there is an included angle between a ground electrode of the ground electrode pair and an adjacent radio frequency electrode, and the included angle is greater than 0 degrees and less than 180 degrees; and the two optical cavity mirrors of the second optical cavity are symmetrically distributed along the center line, one optical cavity mirror of the second optical cavity is located in the included angle between the ground electrode and the adjacent radio frequency electrode, and the other optical cavity mirror of the second optical cavity is located in an included angle between the other ground electrode and the other adjacent radio frequency electrode.

Optionally, in still yet another possible implementation of this embodiment of this application, when there are at least two ions in the ion trap system, the beam waist radius of the first optical cavity is greater than a spacing between two adjacent ions in the at least two ions, and the beam waist radius of the second optical cavity is less than or equal to the spacing between the two adjacent ions in the at least two ions. Optionally, when there are more than two ions, spacings between adjacent ions are the same.

The ion-optical cavity coupling method provided in this embodiment of this application may be implemented by using the ion-optical cavity coupling system shown in FIG. 8 to FIG. 11. Implementation principles and technical effects thereof are similar, and details are not described herein again.

"A plurality of" in this application refers to two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. In the formula, the character "/" indicates a "division" relationship between the associated objects.

It can be understood that numerical symbols used in the embodiments of this application are differentiated merely for ease of description, but are not used to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. An ion-optical cavity coupling system, comprising:
a first optical cavity,
a second optical cavity,
a direct current electrode pair,
a ground electrode pair, and
a radio frequency electrode pair, wherein
the ion-optical cavity coupling system comprises at least one ion;
two optical cavity mirrors of the first optical cavity are distributed on two sides of the at least one ion, two optical cavity mirrors of the second optical cavity are distributed between the two optical cavity mirrors of the first optical cavity, and a beam waist radius of the first optical cavity is greater than a beam waist radius of the second optical cavity;
two direct current electrodes of the direct current electrode pair are distributed on outer sides of the two optical cavity mirrors of the first optical cavity, and the ground electrode pair and the radio frequency electrode pair are distributed between the two optical cavity mirrors of the first optical cavity;
the first optical cavity obtains a quantum optical signal, and transfers quantum information of the quantum optical signal to a single ion of the ion-optical cavity coupling system; and
the second optical cavity obtains the quantum information in the single ion.

2. The system according to claim 1, wherein that the first optical cavity obtains the quantum optical signal, and transfers quantum information of the quantum optical signal to the single ion of the ion-optical cavity coupling system comprises:
the first optical cavity obtains the quantum optical signal to enable the quantum optical signal to be absorbed by the at least one ion; and sequentially transfers the quantum information of the quantum optical signal to a collective excited state and an excited state of a collective motion mode of the at least one ion, and transfers the quantum information of the quantum optical signal from the excited state of the collective motion mode to an excited state of one of the at least one ion.

3. The system according to claim 1, wherein that the second optical cavity obtains the quantum information in the single ion comprises:
the second optical cavity positions the single ion using laser light to obtain the quantum information in the single ion.

4. The system according to claim 1, wherein both a strength of coupling between the first optical cavity and any one of the at least one ion, and a strength of coupling between the second optical cavity and any one of the at least one ion, are represented by $g_0$, and wherein $g_0$ is expressed by the following formula:

$$g_0 = \sqrt{\frac{3c\gamma\lambda^2}{\pi^2 L\omega_0^2}}$$

wherein c represents a speed of light, L represents a length of the first optical cavity or the second optical cavity, $\omega_0$ represents a beam waist radius of the first optical cavity or the second optical cavity, $\lambda$ represents a wavelength of the quantum optical signal, and $\gamma$ represents a spontaneous emission rate of an ion.

5. The system according to claim 4, wherein a total coupling strength $g_N$ of all ions in the ion-optical cavity coupling system is expressed by the following formula:

$$g_N = \sqrt{N}g_0$$

wherein N represents a total quantity of ions in the ion-optical cavity coupling system.

6. The system according to claim 1, wherein both a first optical cavity mirror of the first optical cavity and a first optical cavity mirror of the second optical cavity are coated with a first reflection film, both a second optical cavity mirror of the first optical cavity and a second optical cavity mirror of the second optical cavity are coated with a second reflection film, a reflectivity of the first reflection film falls within a first preset range, a reflectivity of the second reflection film falls within a second preset range, and a maximum value of the first preset range is less than a minimum value of the second preset range.

7. The system according to claim 1, wherein when a quantity of the at least one ion is 1, distances between the two optical cavity mirrors of the second optical cavity and an equilibrium position of the ion are the same, and two ground electrodes of the ground electrode pair and two radio frequency electrodes of the radio frequency electrode pair are distributed on two sides of the ion.

8. The system according to claim 1, wherein when a quantity of the at least one ion is greater than 1, a straight line on which an equilibrium position of the at least one ion is located is a center line, distances between the two optical cavity mirrors of the second optical cavity and the center line are the same.

9. The system according to claim 8, wherein there is an included angle between a ground electrode of the ground electrode pair and an adjacent radio frequency electrode, and the included angle is greater than 0 degrees and less than 180 degrees; and
one optical cavity mirror of the second optical cavity is located in the included angle between the ground electrode and the adjacent radio frequency electrode, and the other optical cavity mirror of the second optical cavity is located in an included angle between the other ground electrode and the other adjacent radio frequency electrode.

10. The system according to claim 1, wherein when a quantity of the at least one ion is greater than 1, the beam waist radius of the first optical cavity is greater than a spacing between two adjacent ions, and the beam waist radius of the second optical cavity is less than or equal to the spacing between two adjacent ions.

11. An ion-optical cavity coupling method, wherein the method is performed with an ion-optical cavity coupling system that comprises: a first optical cavity, a second optical cavity, a direct current electrode pair, a ground electrode pair, and a radio frequency electrode pair, wherein the ion-optical cavity coupling system comprises at least one ion; two optical cavity mirrors of the first optical cavity are distributed on two sides of the at least one ion, two optical cavity mirrors of the second optical cavity are distributed between the two optical cavity mirrors of the first optical cavity, wherein a beam waist radius of the first optical cavity is greater than a beam waist radius of the second optical cavity; two direct current electrodes of the direct current electrode pair are distributed on outer sides of the two optical cavity mirrors of the first optical cavity, and the ground electrode pair and the radio frequency electrode pair are distributed between the two optical cavity mirrors of the first optical cavity; and wherein the method comprises:
obtaining, using the first optical cavity, a quantum optical signal that carries quantum information;
transferring the quantum information of the quantum optical signal to a single ion of the ion-optical cavity coupling system using the first optical cavity; and
obtaining the quantum information in the single ion using the second optical cavity.

12. The method according to claim 11, wherein the transferring the quantum information of the quantum optical signal to the single ion of the ion-optical cavity coupling system using the first optical cavity comprises:
enabling the quantum optical signal to be absorbed by the at least one ion under a confinement effect produced by the three electrode pairs and using the first optical cavity; and sequentially transferring the quantum information of the quantum optical signal to a collective excited state and an excited state of a collective motion mode of the at least one ion, and transferring the quantum information of the quantum optical signal from the excited state of the collective motion mode to an excited state of one of the at least one ion.

13. The method according to claim 11, wherein the obtaining the quantum information in the single ion using the second optical cavity comprises:
positioning the single ion using laser light and the second optical cavity; and
obtaining the quantum information in the single ion using the second optical cavity.

14. The method according to claim 11, wherein both a strength of coupling between the first optical cavity and any one of the at least one ion, and a strength of coupling between the second optical cavity and any one of the at least one ion, are represented by $g_0$, and wherein $g_0$ is expressed by the following formula:

$$g_0 = \sqrt{\frac{3c\gamma\lambda^2}{\pi^2 L\omega_0^2}}$$

wherein c represents a speed of light, L represents a length of the first optical cavity or the second optical cavity, $\omega_0$ represents a beam waist radius of the first optical cavity or the second optical cavity, $\lambda$ represents a wavelength of the quantum optical signal, and $\gamma$ represents a spontaneous emission rate of an ion.

15. The method according to claim 14, wherein a total coupling strength $g_N$ of all ions in the ion-optical cavity coupling system is expressed by the following formula:

$$g_N = \sqrt{N} g_0$$

wherein N represents a total quantity of ions in the ion-optical cavity coupling system.

16. The method according to claim 11, wherein both a first optical cavity mirror of the first optical cavity and a first optical cavity mirror of the second optical cavity are coated with a first reflection film, both a second optical cavity mirror of the first optical cavity and a second optical cavity mirror of the second optical cavity are coated with a second reflection film, a reflectivity of the first reflection film falls within a first preset range, a reflectivity of the second reflection film falls within a second preset range, and a maximum value of the first preset range is less than a minimum value of the second preset range.

17. The method according to claim 11, wherein when a quantity of the at least one ion is 1, distances between the two optical cavity mirrors of the second optical cavity and an equilibrium position of the ion are the same, and two ground electrodes of the ground electrode pair and two radio frequency electrodes of the radio frequency electrode pair are distributed on two sides of the ion.

18. The method according to claim 11, wherein when a quantity of the at least one ion is greater than 1, a straight line on which an equilibrium position of the at least one ion is located is a center line, distances between the two optical cavity mirrors of the second optical cavity and the center line are the same.

19. The method according to claim 18, wherein there is an included angle between a ground electrode of the ground electrode pair and an adjacent radio frequency electrode, and the included angle is greater than 0 degrees and less than 180 degrees; and one optical cavity mirror of the second optical cavity is located in the included angle between the ground electrode and the adjacent radio frequency electrode, and the other optical cavity mirror of the second optical cavity is located in an included angle between the other ground electrode and the other adjacent radio frequency electrode.

20. The method according to claim 11, wherein when a quantity of the at least one ion is greater than 1, the beam waist radius of the first optical cavity is greater than a spacing between two adjacent ions, and the beam waist radius of the second optical cavity is less than or equal to the spacing between two adjacent ions.

* * * * *